(12) United States Patent  
Steiger et al.

(10) Patent No.: US 9,336,939 B2  
(45) Date of Patent: May 10, 2016

(54) HIGH-VOLTAGE TRANSFORMER MODULE

(71) Applicant: ABB TECHNOLOGY AG, Zürich (CH)

(72) Inventors: Matthias Steiger, Bitterfeld-Wolfen OT Holzweissig (DE); Guido Schulze, Gross-Schwarzlosen (DE); Janusz Szczechowski, Leipzig (DE)

(73) Assignee: ABB TECHNOLOGY AG, Zurich (CH)

( * ) Notice: Subject to any disclaimer, the term of this patent is extended or adjusted under 35 U.S.C. 154(b) by 127 days.

(21) Appl. No.: 14/268,477

(22) Filed: May 2, 2014

(65) Prior Publication Data

US 2014/0240901 A1 Aug. 28, 2014

Related U.S. Application Data

(63) Continuation of application No. PCT/EP2012/004302, filed on Oct. 16, 2012.

(30) Foreign Application Priority Data

Nov. 2, 2011 (EP) .................................... 11008721

(51) Int. Cl.
*H01F 27/06* (2006.01)
*H01F 27/00* (2006.01)
*H02B 1/26* (2006.01)

(52) U.S. Cl.
CPC .............. *H01F 27/06* (2013.01); *H01F 27/002* (2013.01); *H02B 1/26* (2013.01)

(58) Field of Classification Search
None
See application file for complete search history.

(56) References Cited

U.S. PATENT DOCUMENTS

| | | | |
|---|---|---|---|
| 5,171,113 A | 12/1992 | Hove | |
| 8,427,172 B2 * | 4/2013 | Werle | G01R 31/021 324/543 |
| 8,952,704 B2 * | 2/2015 | Werle | G01R 31/021 324/537 |
| 9,166,384 B2 * | 10/2015 | Kobayashi | H02B 1/54 |
| 2008/0064317 A1 * | 3/2008 | Yates | B65D 88/745 454/118 |
| 2008/0123288 A1 * | 5/2008 | Hillis | H05K 7/20745 361/679.34 |
| 2009/0241578 A1 * | 10/2009 | Carlson | F25D 17/06 62/259.2 |
| 2009/0242552 A1 | 10/2009 | Myers et al. | |
| 2010/0301672 A1 * | 12/2010 | Di Cristofaro | H02B 1/52 307/39 |

(Continued)

FOREIGN PATENT DOCUMENTS

EP 2 133 889 A1 12/2009

OTHER PUBLICATIONS

International Search Report (PCT/ISA/210) mailed on Nov. 21, 2013, by the European Patent Office as the International Searching Authority for International Application No. PCT/EP2012/004302.

(Continued)

*Primary Examiner* — Courtney Smith
(74) *Attorney, Agent, or Firm* — Buchanan Ingersoll & Rooney PC

(57) ABSTRACT

A high-voltage transformer module includes a transformer core including at least one winding, and a mechanical supporting structure having the transformer core integrated permanently therein. The mechanical supporting structure has corner points arranged in the form of a right-parallelepiped. The corner points are in the form of load transfer points and are arranged corresponding to the dimensions of a CSC (International Convention for Safe Containers) container.

18 Claims, 3 Drawing Sheets

(56) References Cited

U.S. PATENT DOCUMENTS

| | | | | |
|---|---|---|---|---|
| 2011/0133754 A1* | 6/2011 | Werle | ............... | G01R 31/1227 |
| | | | | 324/555 |
| 2011/0240497 A1* | 10/2011 | Dechene | ............... | E04H 5/02 |
| | | | | 206/320 |
| 2013/0083476 A1* | 4/2013 | Clidaras | ............... | G06F 1/20 |
| | | | | 361/679.41 |

OTHER PUBLICATIONS

Written Opinion (PCT/ISA/237) mailed on Nov. 21, 2013, by the European Patent Office as the International Searching Authority for International Application No. PCT/EP2012/004302.

* cited by examiner

1

HIGH-VOLTAGE TRANSFORMER MODULE

RELATED APPLICATIONS

This application claims priority as a continuation application under 35 U.S.C. §120 to PCT/EP2012/004302, which was filed as an International Application on Oct. 16, 2012 designating the U.S., and which claims priority to European Application 11008721.0 filed in Europe on Nov. 2, 2011. The entire contents of these applications are hereby incorporated by reference in their entireties.

FIELD

The present disclosure relates to a high-voltage transformer module. More particularly, the present disclosure relates to a high-voltage transformer module including a transformer core having at least one winding, and to an electrical energy system including such a high-voltage transformer module.

BACKGROUND

It is generally known that high-voltage transformers, for example in a voltage range of from 110 kV or 380 kV and in a power range of 100 MVA or higher, both for inspection purposes and after termination of any possible maintenance or repair work or else directly after their fabrication, need to be tested intensively in order to ensure their correct functioning for the next operation time period, which is often a number of years. Both stationary and mobile testing stations are used. The latter are in particular constructed for in-situ testing of transformers, then dismantled and transported to the next use location. Even when the transport and construction of a mobile testing station is usually associated with a very high degree of complexity, this complexity is usually nevertheless lower than the complexity involved in transporting a transformer with a weight of, for example, 200 tons (t) to a stationary testing station. In addition, the downtime of a transformer undergoing testing is then significantly reduced.

In this case, both DC and AC testing stations are used, with which the corresponding test conditions can be produced. In particular, AC testing stations need to be capable of providing a high electrical testing power with variable frequency and variable voltage over a relatively long time period, often lasting several hours, for example, for a continuous load test or a short-circuit test. In addition to power electronics components such as inverters and rectifiers, for example, a test transformer is also required in order to convert, for example, the AC voltage generated by the converters to a voltage level required for the testing or else in order to match the voltage of the feed available to the inverters.

Such a transformer is a component with a considerable size and a considerable weight, for example 15t, owing to the high maximum test power required, for example 20 MVA or higher. The transport of such a transformer is disadvantageously performed in the form of special transport, for example on a flatbed truck, and is therefore particularly time-intensive and complex. The construction, installation and first operation of such a test transformer in situ is also associated with a considerable amount of outlay in terms of time and logistics.

SUMMARY

An exemplary embodiment of the present disclosure provides a high-voltage transformer module. The exemplary high-voltage transformer module includes a transformer core including at least one winding, and a mechanical supporting structure having the transformer core integrated permanently therein. The mechanical supporting structure has corner points arranged in the form of a right-parallelepiped. The corner points are in the form of load transfer points and are arranged corresponding to the dimensions of a CSC (International Convention for Safe Containers) container.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
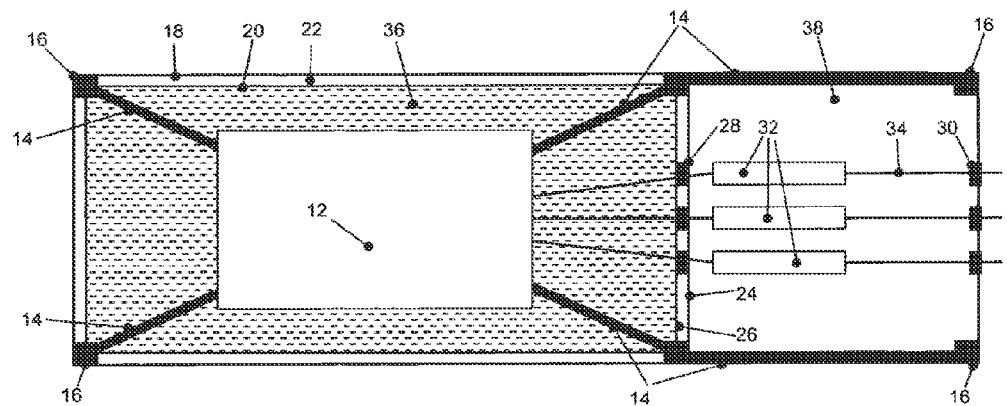
FIG. 1 shows a first high-voltage transformer module according to an exemplary embodiment of the present disclosure.

Exemplary embodiments of the present disclosure provide a high-voltage transformer or a corresponding electrical energy system which is particularly easy to transport and to erect in situ.

According to an exemplary embodiment, the high-voltage transformer module of the present disclosure is integrated permanently in a mechanical supporting structure with corner points arranged in the form of a right-parallelepiped. The corner points are in the form of load transfer points and are arranged corresponding to the dimensions of a CSC (International Convention for Safe Containers) container.

Exemplary embodiments of the present disclosure are based on the idea of first constructing a testing station system for high-voltage transformers including as few and as standardized modules as possible which are easy to transport and can be interconnected easily to form a complete testing station system in situ by corresponding electrical plug-type connections, for example. In order to simplify transport of a high-voltage transformer module, which can also be considered to be an essential component of a testing station system, the corner points of the supporting structure are matched to the standardized grid dimensions of the corner points of standard containers in accordance with CSC (International Convention for Safe Containers). CSC containers have, for example, standardized dimensions of 2.438 m in width, 2.591 m in height and 6.058 m or 12.192 m in length. The eight corner points of a container are at the same time its loading points, via which the forces due to weight are taken away downwards or forces due to weight of containers located above are accommodated.

The mechanical supporting structure is realized, for example, as a rack including stainless steel tube profiles with suitable cross sections, wherein the transformer can then, in accordance with an exemplary embodiment, be arranged centrally. The transformer can be integrated in a rack which is already self-supporting, for example by virtue of it being fastened on resting points of the rack provided for this purpose by means of screw-type or clamping connections. However, it is also possible, in particular when the size of the transformer is close to the size of a container, for the then rather small rack to be embodied as an integral part of the transformer itself.

Therefore, a high-voltage transformer module according to the disclosure can be integrated as a standard container in any desired container stack and transported together with this container stack on a ship, for example. However, the large number of further transport possibilities for standard containers, such as rail or lorries, for example, is advantageously developed for a high-voltage transformer module, so that transport of the high-voltage transformer module is thus considerably simplified.

The erection of the high-voltage transformer module in situ is also markedly simplified by the mechanical supporting structure in which the transformer is permanently integrated. In order to ensure a secure footing, it is only necessary to provide support for the four lower load transfer points, for example by means of suitable foundation segments consisting of concrete. The upper four load transfer points serve, during installation, as retaining eyelets, for example, for lowering on a cable by means of a crane. The arrangement of the transformer including the core and the winding in the supporting structure should therefore be embodied such that safe operation of the transformer in terms of isolation is ensured in the supporting structure, which is actually a fixed part of the high-voltage transformer module according to an exemplary embodiment of the present disclosure. In particular, the minimum spacings from the electrical connections of the transformer which are required for insulation should therefore be adhered to. According to an exemplary embodiment of the high-voltage transformer module, the transformer is in the form of a dry-type transformer for a voltage range up to 30 kV, 60 kV or else even up to 110 kV, for example. In this case, both single-phase, three-phase embodiments and special designs such as isolators or the like are also conceivable.

In accordance with a further configuration of the high-voltage transformer module according to an exemplary embodiment of the present disclosure, the corner points are also in the form of standard container corners, i.e. have in particular corresponding bores and an inner cavity, with the result that, for example, mutual bracing of mutually adjoining container corners is made possible.

In accordance with a particularly exemplary embodiment of the high-voltage transformer module according to an exemplary embodiment of the present disclosure, the areas spanned by the corner points are each in the form of a wall, with the result that a container-like vessel is formed with an interior. As a result, in particular protection during transport is provided for the high-voltage transformer module, which further simplifies transport of the high-voltage transformer module. Such a wall is also used for protection during operation, however. It is an option to provide the possibility of access, for example via a door, to the interior of the container-like vessel in order to enable maintenance. In this case, too, it is necessary to configure the transformer and arrange it within the vessel in such a way that safe operation, in terms of isolation, is ensured in the case of existing walls. The electrical connections of the transformer then need to be passed to the outside by means of suitable lead throughs, for example through a side wall. A direct lead through of correspondingly insulated cables is also possible, in which case, for example, a cable loop which can be withdrawn in each case needs to be kept in the vessel interior.

In order to ensure complete compatibility of a high-voltage transformer module according to the disclosure with existing container transport systems, the vessel may be in the form of a container corresponding to CSC, for example.

In accordance with an exemplary embodiment of the present disclosure, the walls are each at least regionally double-walled. As a result, the protective function of the wall is further increased and thus also protection is provided by means of the second wall in the event of damage to one wall.

In accordance with an exemplary embodiment of the present disclosure, at least one transverse wall is provided in the interior, by means of which transverse wall the interior is divided into at least a first interior and a second interior, wherein the transformer core with the winding is arranged in the first interior. The division of the common interior into a first interior and a second interior makes it possible, for example, to integrate further components of an entire system into the high-voltage transformer module, which components are then advantageously arranged in the second interior, separated from the transformer by the transverse wall. This embodiment is only possible in the case of relatively low transformer powers, however, where there is still a corresponding amount of space available in the interior of the container-like vessel.

In accordance with an exemplary embodiment, the common interior or the first interior in which the transformer is arranged, depending on the embodiment, is hermetically sealtight. This enables filling of the relevant interior with a transformer oil, with the result that the transformer located therein is ultimately in the form of an oil-filled transformer. Owing to the insulator property of oil, this is of interest in particular at voltages which are higher than the previously mentioned voltages, for example at 110 kV or above. The first interior then acts as transformer tank and should also be configured corresponding to the tank of an oil-filled transformer, for example with barriers, in which case outgoing lines may be fitted in situ are then also required. Likewise, the filling of the tank with oil may be performed in situ in order thus not to allow the transformer weight to become too great. For safety reasons, the interior respectively filled with oil or to be filled with oil should be surrounded by a double wall.

Corresponding to a further variant of the high-voltage transformer module according to an exemplary embodiment of the present disclosure, an electrical switchgear assembly, which is galvanically connected to the at least one winding of the transformer is provided within the interior or the second interior. Optionally however, at least one inverter and/or rectifier, which is galvanically connected to the at least one winding, is also provided within the interior or the second interior. Both embodiments are of course only used in the case of there still being sufficient space available within the container or container-like vessel, i.e. for example in the case of a transformer power of only a few MVA. In this way, further component parts of an entire modular system can advantageously be integrated in the high-voltage transformer module and the number of entire modules required can therefore be reduced.

In accordance with an exemplary embodiment of the present disclosure, a cooling system including at least one heat exchanger is provided within the interior or the first and/or second interior, wherein, furthermore, a movement apparatus is provided, by means of which the at least one heat exchanger is movable from a transport position within one of the interiors into a working position located at least partially outside.

During their operation, transformers generate an electrical power loss which results in a heat input into the container. In particular in the case of the arrangement of the transformer in a closed container-like vessel, this rapidly results in an impermissibly high temperature rise within the vessel. This effect is also assisted by other components producing heat loss within the vessel, in particular by means of converter cabinets with their power electronics. Therefore, the problem of the dissipation of heat losses occurring during operation is of particular importance.

An advantage of the cooling system according to the disclosure in accordance with this exemplary embodiment of the disclosure is a particularly space-saving and compact arrangement of the heat exchanger for transport purposes within the high-voltage transformer module, wherein, for operation of the high-voltage transformer module, the heat exchanger is at least partially moved out of the high-voltage transformer module. Owing to the then increased contact area with the ambient air, markedly increased efficiency of the cooling system is achieved. According to an exemplary embodiment, such a cooling system is in the form of a closed cooling circuit including a condenser and an evaporator, wherein the or else a plurality of evaporators absorb thermal energy by evaporation of the cooling liquid in the interior of the high-voltage transformer module and output this thermal energy to the outwardly movable condenser. Such a condenser is arranged, for example, in the upper region of the testing station module and is movable out of the testing station module through a respective opening in a manner similar to a drawer. The efficiency of such a cooling system can be further increased, if required, by virtue of a blower directed onto the surface of the condenser.

In accordance with an exemplary embodiment of the high-voltage transformer module, at least one cutout, which can be closed by means of a cover, is provided in at least one wall. The cutout is used in particular for leading through the electrical supply lines or connections of the high-voltage transformer module, with the result that the lines or connections can be electrically connected to further modules of an entire system without any problems. The cover is used for protection during transport. After erection in situ, protection is no longer required and the cover can be removed, with the result that the cutout is open. Correspondingly insulated connecting cables can then be guided directly through the cutout, if necessary using a respective electric leadthrough known to a person skilled in the art. However, it is also possible, for example, for a terminal block to be used for corresponding electrical connections, which terminal block has been stored in the interior of the container during transport and already has all of the rear module-internal connections, for example to the transformer. In this way, both safe transport without any disruptive contour at the connection point and simple interconnection of the high-voltage transformer module with other modules are ensured.

The object is also achieved by an electrical energy system which has a modular design and includes at least one high-voltage transformer module according to an exemplary embodiment of the present disclosure. As mentioned at the outset, the modular design enables simple transport and problem-free construction in situ, for example, using containers or container-like vessels as the housing, in particular because the system components are arranged in a fixed position within the container. In their fixed position, the components are already permanently interconnected within the container, with the result that now only the module needs to be connected as such. The modular design also makes it possible to electrically interconnect a plurality of standardized and container-based system modules, as required, such as converter modules, for example, to form an electrical energy system. Thus, for example, the power of a modular electrical energy system can be correspondingly increased by implementing further container-based system modules.

According to an exemplary embodiment, the modular electrical energy system is a testing station system for power transformers, i.e. provision is made for the predetermined voltage of an electrical feed to be converted into a test voltage (single-phase or else three-phase) with a variable level and frequency. A container-based modular electrical energy system is of course also suitable for other applications, however, for example as an energy system for wind farms or offshore wind farms. A high-voltage transformer module with a container-based design including transformer and converters, for example, can easily be designed such that it is suitable as a converter for a wind turbine. The object of such a converter for wind turbines consists in converting a generated variable voltage into a defined feed voltage and therefore ultimately is very comparable to the object of a testing station system. Advantages of a high-voltage transformer module according to the disclosure with such an embodiment, namely its ease of transportation and installation in situ, is likewise of very high importance when constructing wind farms, with the result that the disclosure can also advantageously be used in this sector.

Further advantageous possible configurations are set forth in the following description of exemplary embodiments with reference to the drawings.

FIG. 1 shows a first exemplary high-voltage transformer module 10 in a sectional plan view. A transformer 12 is permanently integrated in a strut-like mechanical supporting structure 14 and is supported thereby. The supporting structure 14 extends to four lower load transfer points 16 and to four further upper load transfer points (not shown), which, overall, are arranged in the form of a right-parallelepiped. The right-parallelepiped form corresponds to the external dimensions of a 40 foot standard container, with the result that the high-voltage transformer module 10 can be integrated in a stack with CSC containers.

The surface regions between the load transfer points are formed as double walls 18, 20, with the result that a container-like vessel with an interior is formed. Furthermore, a double-walled inner transverse wall 24, 26 is provided between the side walls, with the result that a hermetically sealtight first interior 36 enveloped by a double wall and a second interior 38 adjoining the first interior are formed. The first interior 36 which is enveloped by a double wall and in which the transformer 12 is arranged is filled with oil and a three-phase electrical switchgear assembly 32 is arranged in the second interior 38. The electrical switchgear assembly is connected to the transformer 12 via galvanic connecting conductors 34, wherein the connecting conductors are guided through the inner transverse wall 24, 26 into the first oil-filled interior 36 by means of hermetically sealing leadthroughs 28. The leadthroughs correspond to leadthroughs known to a person skilled in the art from his training. The switchgear assembly 32 is furthermore connected to a further container module located outside the container-like vessel by means of three galvanic connecting conductors 34, wherein these conductors are guided through corresponding leadthroughs at the outer end wall.

Figure 2:
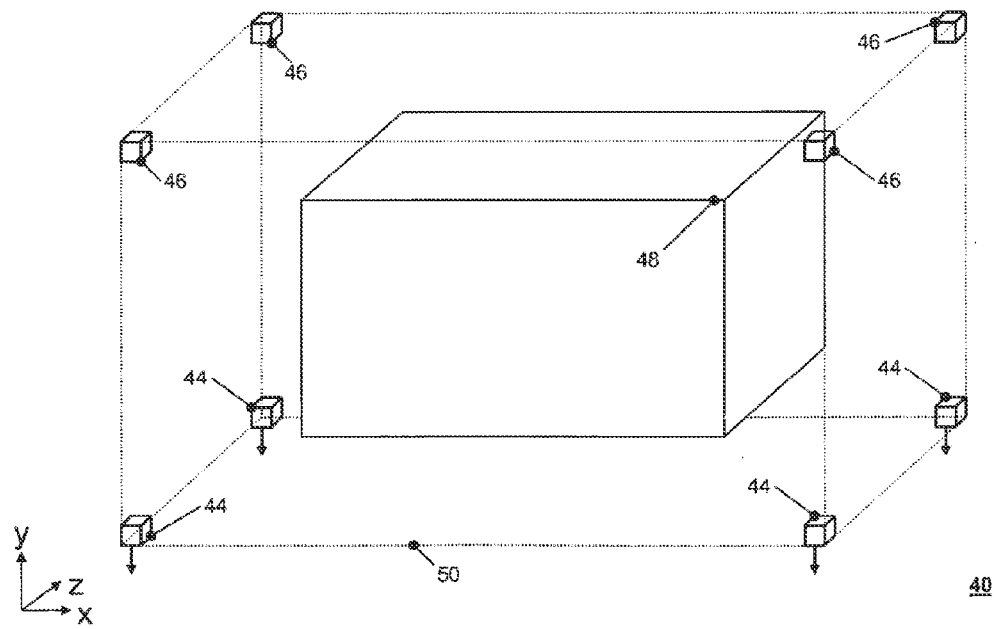
FIG. 2 shows a second high-voltage transformer module according to an exemplary embodiment of the present disclosure.

FIG. 2 shows a second exemplary high-voltage transformer module 40 in a three-dimensional basic sketch, in which, for reasons of clarity, there is no illustration of a mechanical supporting structure. Four lower load transfer points 44 and four upper load transfer points 46 form the corner points of a right-parallelepipedal container-like vessel 50 indicated by dashed lines, which vessel has the dimensions of a standard container. The load transfer points 44, 46 illustrated as being in the form of dice are formed from cast iron and have respective bores in their three outer sides, which bores open out into an interior cavity of the respective die. Therefore, mutually adjoining container corners can in each case be connected to one another effectively at the bores, for example for securing purposes during transport. A transformer 48 is shown which is arranged centrally within the container-like vessel 50 and is held by the supporting structure (not shown). This transformer in this example is a dry-type transformer with a rated voltage in the region of 60 kV and a rated power of 20 MVA, wherein these values only represent example values. The lateral container walls are manufactured from corrugated sheet steel. It is also readily possible for a plurality of transformers to be arranged to be arranged in a common mechanical supporting structure.

Figure 3:
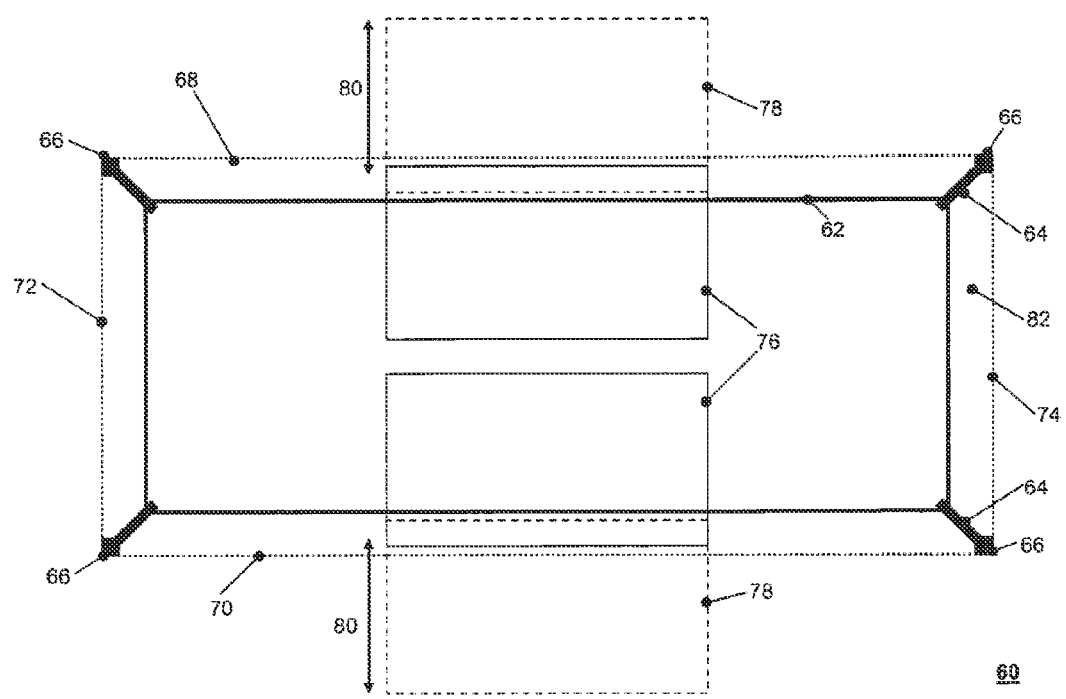
FIG. 3 shows a third high-voltage transformer module according to an exemplary embodiment of the present disclosure.

FIG. 3 shows a third exemplary high-voltage transformer module 60 in a sectional plan view. A dry-type transformer 62, indicated as a right-parallelepiped is arranged centrally in a container, wherein the container is represented by its side walls 68, 70 and its end walls 72, 74, and wherein an interior 82 is formed by the container walls. The transformer 62 is an integral part of a mechanical supporting structure 64, which is indicated in particular by hollow profile connections protruding at the respective corner points of the transformer 62, indicated as a right-parallelepiped, which hollow profile connections become respective load transfer points 66. Two drawer-like heat exchangers in a transport position 76 are indicated above the transformer 62, but within the container, the heat exchangers being movable into a working position 78 along the movement direction 80 by means of a movement apparatus (not shown). The heat exchangers are part of an integrated cooling system of the high-voltage transformer module for transporting away the heat loss occurring during operation of the transformer. A cooling system with a closed cooling circuit, circulating cooling medium, condenser and evaporator, which is known to a person skilled in the art as such, however, has proven to be particularly effective.

Figure 4:
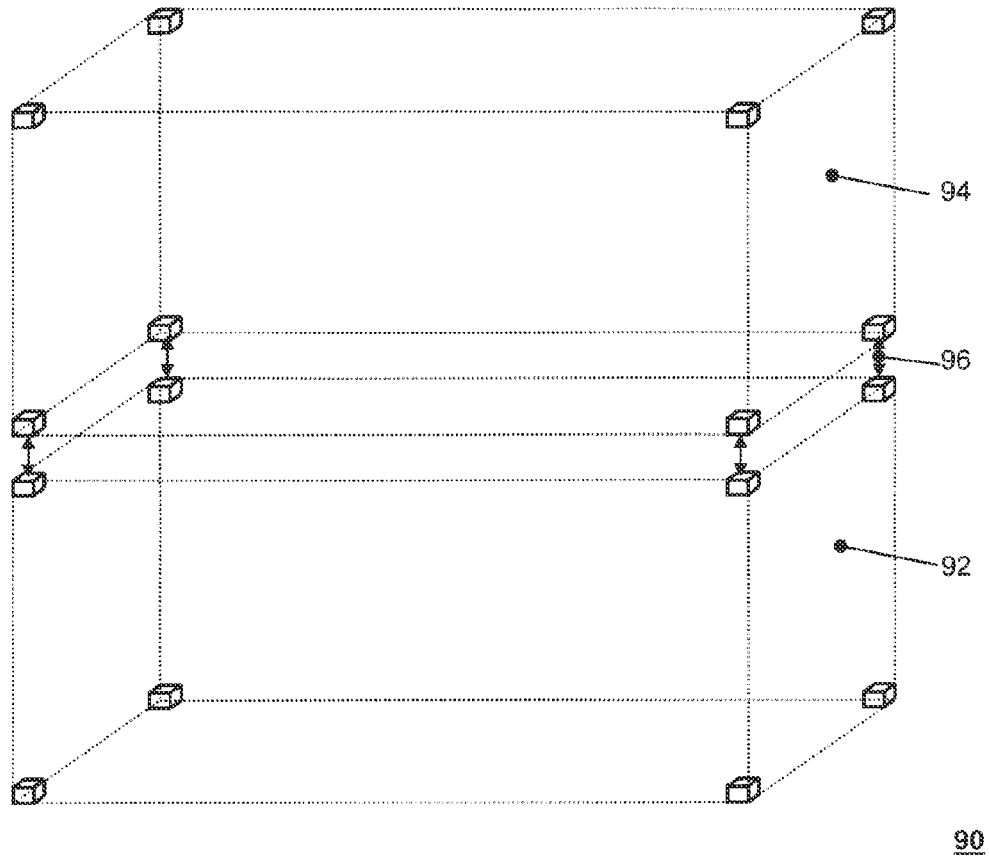
FIG. 4 shows a stack of high-voltage transformer modules according to an exemplary embodiment of the present disclosure.

FIG. 4 shows a stack 90 of two high-voltage transformer modules 92, 94, wherein the respective forces due to weight are transferred via the load transfer points located at the respective corner points. Such stacking occurs, for example, in the case of transport by ship. However, it is readily also possible, if the space conditions in situ allow it, to arrange a plurality of container modules, which are connected to one another to form an electrical energy system or else test system, in a stack in such a way for operation of the container modules.

Figure 5:
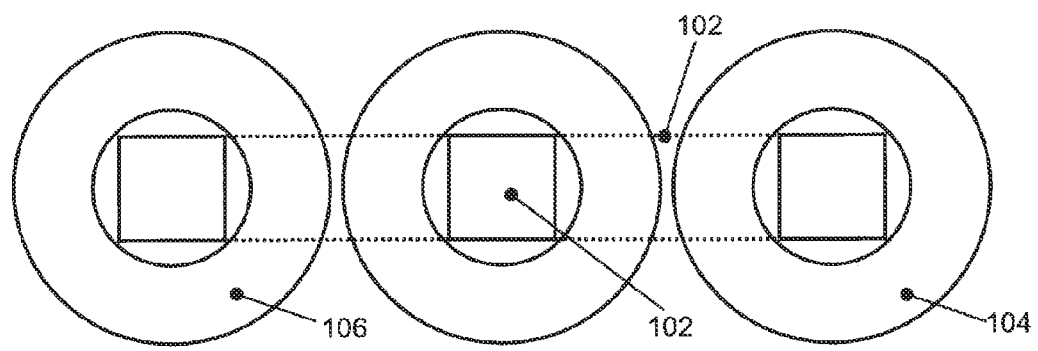
FIG. 5 shows a transformer core including a winding according to an exemplary embodiment of the present disclosure.

FIG. 5 shows a fourth transformer core 102 including winding 104, 106 in an illustration 100. In the other figures, a corresponding transformer core including a winding has been indicated in each case as a right-parallelepiped, whereas this is a more realistic exemplary representation. However, a great breadth of other designs is also possible, such as transformers, autotransformers, single-phase embodiments.

It will therefore be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

10 First exemplary high-voltage transformer module
12 First transformer core including winding
14 First mechanical supporting structure
16 Load transfer points
18 Outer wall
20 Inner wall
22 Cavity between outer and inner walls
24 Outer transverse wall
26 Inner transverse wall
28 Inner leadthrough
30 Outer leadthrough
32 Electrical switchgear assembly
34 Galvanic connection
36 Oil-filled first interior
38 Second interior
40 Second exemplary high-voltage transformer module
44 Lower load transfer points
46 Upper load transfer points
48 Second transformer core including winding
50 Container-like vessel
60 Third exemplary high-voltage transformer module
62 Third transformer core including winding
64 Second mechanical supporting structure
66 Load transfer points
68 First side wall
70 Second side wall
72 First end wall
74 Second end wall
76 Heat exchanger in transport position
78 Heat exchanger in working position
80 Movement direction
82 Interior
90 Stack of high-voltage transformer modules
92 First high-voltage transformer module
94 Second high-voltage transformer module
96 Force transfer at load transfer points
100 Fourth transformer core including winding
102 Transformer core
104 First winding
106 Second winding

What is claimed is:
1. A high-voltage transformer module, comprising:
a transformer core including at least one winding; and
a mechanical supporting structure having the transformer core integrated permanently therein, the mechanical supporting structure having corner points arranged in the form of a right-parallelepiped and having a connection extending from the transformer core to each corner point,
wherein the corner points are in the form of load transfer points and are arranged corresponding to the dimensions of a CSC (International Convention for Safe Containers) container, and the transformer core is centrally arranged in the CSC container.
2. The high voltage transformer module as claimed in claim 1, wherein the corner points are in the form of standardized container corners.
3. The high-voltage transformer module as claimed in claim 2, wherein areas spanned by the corner points are each in the form of a wall such that a container like vessel is formed with an interior.

4. The high voltage transformer module as claimed in claim 3, wherein the container like vessel is in the form of a container corresponding to the CSC standard.

5. The high voltage transformer module as claimed in claim 3, wherein the walls are each at least regionally double walled.

6. The high-voltage transformer module as claimed in claim 3, comprising at least one transverse wall in the interior, the transverse wall dividing the interior into at least one first interior and at least one second interior, the transformer core with the winding being arranged in the first interior.

7. The high voltage transformer module as claimed in claim 6, wherein at least one of the interior and the first interior is hermetically sealed.

8. The high voltage transformer module as claimed in claim 7, wherein the at least one of the interior and the first interior is filled with an oil.

9. The high voltage transformer module as claimed in claim 6, comprising:
an electrical switchgear assembly, which is galvanically connected to the at least one winding, the electrical switchgear assembly being provided within one of the interior and the second interior.

10. The high voltage transformer module as claimed in claim 6, comprising:
at least one inverter and/or rectifier, the at least one inverter and/or rectifier being galvanically connected to the at least one winding, and provided within one of the interior and the second interior.

11. The high voltage transformer module as claimed in claim 6, comprising:
a cooling system including at least one heat exchanger being provided within one of the interior, the first interior and the second interior; and
a movement apparatus, by means of which the at least one heat exchanger is movable from a transport position within the one of the interior, the first interior and the second interior into a working position located at least partially outside.

12. The high voltage transformer module as claimed in claim 3, comprising:
at least one cutout configured to be closed by means of a cover, the at least one cutout being provided in at least one of the walls.

13. The high-voltage transformer module as claimed in claim 12, comprising:
an electrical leadthrough arranged in the interior through the at least one cutout.

14. An electrical energy system having a modular design and comprising at least one high voltage transformer module as claimed in claim 1.

15. The electrical energy system as claimed in claim 14, wherein the electrical energy system is a testing station system for power transformers.

16. The high voltage transformer module as claimed in claim 3, comprising:
an electrical switchgear assembly, which is galvanically connected to the at least one winding, the electrical switchgear assembly being provided within the interior.

17. The high voltage transformer module as claimed in claim 3, comprising:
at least one inverter and/or rectifier, the at least one inverter and/or rectifier being galvanically connected to the at least one winding, and provided within one of the interior and the second interior.

18. The high voltage transformer module as claimed in claim 3, comprising:
a cooling system including at least one heat exchanger being provided within the interior; and
a movement apparatus, by means of which the at least one heat exchanger is movable from a transport position within the interior into a working position located at least partially outside.

\* \* \* \* \*